(12) United States Patent
Row et al.

(10) Patent No.: US 9,106,304 B2
(45) Date of Patent: Aug. 11, 2015

(54) CORRECTION OF QUADRATURE ERRORS

(75) Inventors: Paul Murray Row, Bishops Stortford (GB); Dorian Thomas Charles Davies, Bishops Stortford (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/437,469

(22) Filed: Apr. 2, 2012

(65) Prior Publication Data
US 2013/0243135 A1    Sep. 19, 2013

Related U.S. Application Data

(63) Continuation of application No. 12/325,831, filed on Dec. 1, 2008, now Pat. No. 8,160,191.

(51) Int. Cl.
| | |
|---|---|
| *H04B 1/10* | (2006.01) |
| *H04B 1/16* | (2006.01) |
| *H04L 27/36* | (2006.01) |

(52) U.S. Cl.
CPC ............ *H04B 1/1638* (2013.01); *H04L 27/364* (2013.01)

(58) Field of Classification Search
CPC .. H04B 1/16; H04B 1/1036; H04L 25/03038; H04L 27/2647; H04L 2025/03414; H04L 25/03057
USPC ................. 375/350, 346, 316, 296, 295, 297; 455/114
See application file for complete search history.

(56) References Cited

U.S. PATENT DOCUMENTS

| | | |
|---|---|---|
| 5,732,333 A | 3/1998 | Cox et al. |
| 6,313,703 B1 | 11/2001 | Wright et al. |
| 6,597,727 B2 | 7/2003 | Philips et al. |
| 7,024,608 B2 | 4/2006 | Kurokami |

(Continued)

FOREIGN PATENT DOCUMENTS

| | | |
|---|---|---|
| EP | 1489803 | 12/2004 |
| JP | 2003283586 | 10/2003 |

(Continued)

OTHER PUBLICATIONS

Search Report and Written Opinion in related International Patent Application No. PCT/EP2009/066175, Mar. 8, 2010, pp. 1-14.

(Continued)

*Primary Examiner* — Zewdu Kassa
(74) *Attorney, Agent, or Firm* — Meyertons, Hood, Kivlin, Kowert & Goetzel, P.C.

(57) ABSTRACT

Correction of quadrature errors associated with digital communications systems. A correction network may correct a difference between a transmission characteristic of an in-phase signal path and a transmission characteristic of a quadrature signal path. The quadrature signal path may be for the transmission of in-phase and quadrature parts of a signal and the signal comprising frequency components within a baseband. The correction network may include an in-phase input port, a quadrature input port, an in-phase output port and a quadrature output port. Each input port may be connected to each output port by a digital filter network, which may include a set of filter tap coefficients and configuration means for configuring values of the coefficients. Frequency dependent quadrature impairments, e.g., due to the analogue components of a quadrature up-converter or down-converter, may be corrected by suitable control of the coefficients.

20 Claims, 11 Drawing Sheets

(56) References Cited

U.S. PATENT DOCUMENTS

| | | |
|---|---|---|
| 7,778,354 B2 | 8/2010 | Yamaguchi et al. |
| 7,885,351 B2 | 2/2011 | Bitzer et al. |
| 8,068,557 B2 | 11/2011 | Dalipi |
| 2002/0181611 A1 | 12/2002 | Kim |
| 2003/0058960 A1 | 3/2003 | Lee |
| 2004/0155707 A1* | 8/2004 | Kim et al. ............ 330/149 |
| 2005/0014475 A1 | 1/2005 | Kim |
| 2005/0069050 A1* | 3/2005 | Ding et al. ............ 375/296 |
| 2005/0195919 A1* | 9/2005 | Cova ............ 375/297 |
| 2006/0008030 A1 | 1/2006 | Luke et al. |
| 2006/0018404 A1 | 1/2006 | Schutz |
| 2006/0203901 A1* | 9/2006 | Tan et al. ............ 375/233 |
| 2006/0286954 A1 | 12/2006 | Fernandez-Carbaton et al. |
| 2007/0097271 A1 | 5/2007 | Gao et al. |
| 2007/0237260 A1 | 10/2007 | Hori et al. |
| 2008/0095264 A1 | 4/2008 | Deng et al. |
| 2010/0297966 A1 | 11/2010 | Row et al. |

FOREIGN PATENT DOCUMENTS

| | | |
|---|---|---|
| JP | 200822243 | 1/2008 |
| JP | 2008532381 | 8/2008 |
| RU | 2289202 | 12/2006 |

OTHER PUBLICATIONS

First Office Action and translation thereof in Chinese Patent Application No. 200980153981.0, May 27, 2013, pp. 1-23.

Office Action from Russian Patent Application No. 2011123470, mailed Nov. 7, 2013, Russian and English versions, pp. 1-9.

Decision on Patent Grant from Russian Application No. 2412-199057RU/8132, dated May 25, 2014, English and Russian versions, pp. 1-23.

Office Action from Japanese Application No. 2011-538007, issued Sep. 8, 2014, English and Japanese versions, pp. 1-16.

Notice of Allowance from Japanese Application No. 2011538007, issued Jan. 19, 2015, English and Japanese versions, pp. 1-8.

* cited by examiner

CORRECTION OF QUADRATURE ERRORS

RELATED APPLICATION

This application is a continuation of U.S. patent application Ser. No. 12/325,831, filed Dec. 1, 2008, now U.S. Pat. No. 8,160,191.

FIELD OF THE INVENTION

The present invention relates to the correction of quadrature errors associated with digital communications systems, and in particular in a wireless transmit chain in which an up-converter and a down-converter both have a direct conversion architecture.

BACKGROUND OF THE INVENTION

It is common for communications systems to have a digital part in which a signal to be transmitted is processed before transmission and a further digital part in which received signals are processed after reception. Processing in the digital parts is typically carried out at base band, that is to say at the frequency band of signals before any offset for the purpose of transmission at a carrier frequency; generally base band signals encompass zero frequency components, i.e. direct current (DC) components. It is common for base band signals to be represented by in-phase (I) and quadrature (Q) parts, that is to say, a complex representation. The processing may comprise such procedures as filtering, modulation demodulation coding and decoding. It is generally necessary to convert signals to and from the analogue domain for transmission and reception, and in the case of wireless systems, it is necessary to convert signals to and from an appropriate radio frequency.

There are various approaches to conversion of digital signals from base band to and from a radio frequency. One approach is to up convert in the digital domain, so that complex base band signals are multiplied, that is to say mixed, by a digital local oscillator to produce an output at a higher frequency, often called an intermediate frequency (IF), that may then be converted to the analogue domain by a digital to analogue converter. The intermediate frequency signal is a real-only, rather than complex, signal. The analogue signal may then be further frequency translated to an appropriate frequency for transmission. Similarly on reception, signals are converted from the analogue to digital domains at an intermediate frequency, higher than base band, and then mixed down to in-phase and quadrature base band signals digitally. An advantage of this approach is that the conversion from base band complex signals to intermediate frequency signals and vice versa is carried out digitally and so is not subject to analogue errors that may cause differences in response between in-phase and quadrature channels. However, a disadvantage is that digital to analogue converters and analogue to digital converters have to operate at a higher frequency than base band, in order to convert intermediate frequency signals. Operating these components at a higher frequency means that the components are costly, and potentially of lower performance in terms of resolution than lower frequency digital to analogue converters and analogue to digital converters.

An alternative approach to the conversion of digital signals from base band to and from a radio frequency is generally termed direct conversion. In a direct conversion architecture, the base band in-phase and quadrature signals are converted to and from analogue form at base band. On transmit, the analogue in-phase and quadrature signals are then up-converted in the analogue domain by analogue quadrature mixers. Preferably, the up-conversion is to the radio frequency transmission frequency in one step, and as a result use of an intermediate frequency is not required. Similarly, on reception, conversion of received radio frequency signals is preferably directly to in-phase and quadrature base band analogue signals, that are then converted to the digital domain. An advantage of the direct conversion approach is that appropriate digital to analogue and analogue to digital converters may be less costly, and of higher performance in terms of resolution. Also, the omission of the intermediate frequency stage can lead to cost savings due to the need for fewer components. However, there is a potential penalty in that the in-phase and quadrature signal paths involve analogue components such as filters that are subject to variation of component values within a tolerance, so that the analogue properties of the in-phase and quadrature signal paths may vary from equipment to equipment and over temperature.

Errors that cause degradation from the perfectly orthogonal in-phase and quadrature channels that exist in the digital domain are known as quadrature errors, or IQ errors. In particular, there may be problems if there are differential errors between in-phase and quadrature channels. Differential errors between in-phase and quadrature channels may cause, for example, spurious components to be generated in a transmitter and spurious responses in a receiver. In particular, a spurious response may be generated in the opposite side band to that intended; for example, if a signal component is intended to be at a higher frequency than a local oscillator signal, then a differential error between in-phase and quadrature components may lead to a spurious component appearing at a lower frequency than that of the local oscillator signal.

Quadrature errors typically comprise voltage offsets, that is to say DC offsets, differential gain characteristics between in-phase and quadrature signal paths, and phase error between in-phase and quadrature signal paths. A conventional quadrature correction network for the correction of such quadrature errors is illustrated in FIG. 1; gain correction blocks Igain and Qgain are shown, as is a block for the correction of phase errors between in-phase and quadrature paths, marked IQ phase, and blocks for the correction of DC offsets I DC Offset and Q DC Offset.

However, quadrature errors, and in particular differential quadrature errors, in both the upconversion and downconversion may be dependent on frequency within the base band. For example, analogue filtering may introduce such errors, particularly in anti-aliasing filters, due to the variation of the values of analogue components within component tolerance limits and with temperature. Conventional correction networks cannot correct such errors.

The present invention addresses these disadvantages.

SUMMARY OF THE INVENTION

In accordance with a first aspect of the present invention, there is provided a correction network according to claim 1.

More specifically, according to one aspect there is provided a correction network for correcting a difference between a transmission characteristic of an in-phase signal path and a transmission characteristic of a quadrature signal path, said quadrature signal path being for the transmission of in-phase and quadrature parts of a signal and the signal comprising frequency components within a base band, wherein the correction network comprises an in-phase input port, a quadrature input port, an in-phase output port and a quadrature output port, wherein each input port is connected to each output port by a digital filter network, the digital filter network comprising a set of filter tap coefficients and configuration means for configuring values of said set of filter tap coefficients.

The advantage of connecting each input port to each output port by a digital filter network comprising a set of filter tap coefficients and having configuration means for configuring values of said set of filter tap coefficients is that frequency dependent quadrature impairments, for example due to the analogue components of a quadrature up-converter or down-converter, may be corrected by suitable control of the coefficients.

In one embodiment the digital filter network comprises:
- a first digital filter connecting the in-phase input port to the in-phase output port;
- a second digital filter connecting the in-phase input port to the quadrature output port;
- a third digital filter connecting the quadrature input port to the in-phase output port; and
- a fourth digital filter connecting the quadrature input port to the quadrature output port,
- wherein each digital filter comprises a respective set of filter tap coefficients and respective configuration means for configuring values of said respective set of filter tap coefficients.

Each digital filter can be embodied as a finite impulse response filter, which is advantageous because a finite impulse response filter may be controlled, by means of suitably selected coefficients, to provide a good approximation to the frequency characteristics of quadrature impairments.

Alternatively, each digital filter can be embodied as a polynomial structure based on a Volterra series, which is advantageous because such a filter provides a very good cancellation of quadrature impairment components.

In accordance with a second aspect of the invention, there is provided a method of controlling a transmit chain according to claim 4. The transmit chain comprises a correction network, a quadrature up-converter and a quadrature down-converter, the correction network being for correcting a difference between a transmission characteristic of an in-phase signal path and a transmission characteristic of a quadrature signal path in a quadrature up-converter, the quadrature up-converter being for use in the up-conversion of a signal input to said correction network, and the quadrature down-converter being for use in down-converting signals received thereby, wherein the up-converter has an output coupled to said down-converter, the correction network is configurable via a set of filter tap coefficient values, and the input signal comprises frequency components within a base band. In one embodiment the method comprises:
- coupling an output signal from the output of the up-converter to said quadrature down-converter;
- using the down-converter to down-convert the coupled signal;
- comparing the down-converted signal with the input signal; and
- modifying the values of said filter tap coefficients on the basis of the comparison.
- whereby to correct said difference by a correction applied to a said frequency component within the base band, said correction being dependent on the frequency of the said frequency component within the base band.

The benefit of controlling the transmit chain by updating the set of values of filter tap coefficients on the basis of a comparison of a down-converted signal with the input signal is that accurate control of the correction network may be achieved, specifically via a frequency dependent characteristic of the correction network.

In one arrangement, the down-converted signal is compared with the input signal so as to determine an error signal; this error signal is then used, together with the input signal, to modify the set of values of filter tap coefficients. A training algorithm can then be used to update the values of the filter tap coefficients on the basis of the error signal and the input signal; a training algorithm is beneficial because it provides an efficient method of updating the values of the filter tap coefficients.

Preferably the method comprises providing the up-converter and the down-converter with a local oscillator signal generated by a local oscillator signal source, the local oscillator being operable in a plurality of operational states comprising:
- a first operational state in which the local oscillator is arranged to input said local oscillator signal to the up-converter and the down-converter; and
- a second operational state in which the local oscillator is arranged to apply a phase shift to the signal input to up-converter or the down-converter when the local oscillator is operating in the first operational state;
- determining, for each operational state, an error signal by comparing the down-converted signal with the input signal;
- determining, for each operational state, an intermediate set of values of filter tap coefficients on the basis of the error signal and the input signal; and
- updating current set of values of filter tap coefficients to produce an updated set of values on the basis of a vector combination of the intermediate sets of values with the current set of values.

As a result the corrector network may be controlled to correct quadrature errors in the up-converter even in the presence of quadrature errors in the down-converter.

Advantageously, the down-converter further is in operative association with a post-correction network arranged to correct a differential error between in-phase and quadrature transmission paths in the quadrature down-converter, the down-converted signal comprising frequency components within a base band, and the post-correction network comprising a set of post-corrector filter tap coefficients and configuration means for configuring values of said set of post-corrector filter tap coefficients, wherein the method further comprises:
- updating current values of post-corrector filter tap coefficients to produce an updated post-corrector set of coefficients on the basis of a vector combination of the intermediate sets of values of said filter tap coefficients with the current post-corrector set of coefficients; and
- using the updated post-corrector set of values to control the post-correction network,
- whereby to correct said differential error in the quadrature down-converter by a correction applied to each said frequency component that is dependent on the frequency of said frequency component within the base band.

This provides a means for controlling both a frequency dependent corrector network for an up-converter and a frequency dependent corrector network for a down-converter. Further, frequency dependent correction of a down-converter can be used as an input to a predistortion controller for a power amplifier, thereby improving the operation of the predistortion controller.

The afore-mentioned functionality can be embodied as software, or computer-readable code, encoded on a computer readable medium for use in controlling the correction network, the up-converter and the down-converter in the manner described above.

According to a further aspect of the invention there is provided a transmit chain comprising:
a transmit path comprising:
 a correction network for correcting a differential error between in-phase and quadrature signal paths for the transmission of an input signal, the signal comprising frequency components within a base band, wherein the correction network comprises an in-phase input port, a quadrature input port, an in-phase output port and a quadrature output port and wherein each input port is connected to each output port by a digital filter network, the digital filter network comprising a set of filter tap coefficients and configuration means for configuring values of said set of filter tap coefficients; and
 a quadrature up-converter for up-converting the input signal; and an observation path comprising:
 a coupler for receiving a portion of the up-converted input signal; and
 a quadrature down-converter for down-converting the signal received by the coupler to base band signal components;
the transmit chain further comprising a controller arranged to:
determine an error signal by comparing the down-converted signal with the input signal;
modify the set of values of filter tap coefficients on the basis of the error signal and the input signal; and
use the updated set of values to control the correction network, whereby to correct said differential error by a correction applied to each said frequency component that is dependent on the frequency of said frequency component within the base band.

DETAILED DESCRIPTION OF THE INVENTION

In general, the present invention is directed to methods and apparatus for for correcting quadrature errors in communications systems.

By way of example an embodiment of the invention will now be described in the context of a transmit chain of a wireless system, that is to say a series of components in the transmit section of a wireless system, in which a digital signal is up-converted in a direct conversion transmit chain and in which a sample of the transmitted signal is down-converted in a direct conversion receiver for reception by an observation receiver. The observation receiver may be used for the control of a pre-distortion function applied to the digital signal before up-conversion, to pre-correct for a non-linear response of a power amplifier. However, it will be understood that this example is for illustration only and the invention is not limited to use in wireless systems or for systems involved with pre-distortion of a non-linear amplifier.

Figure 2:
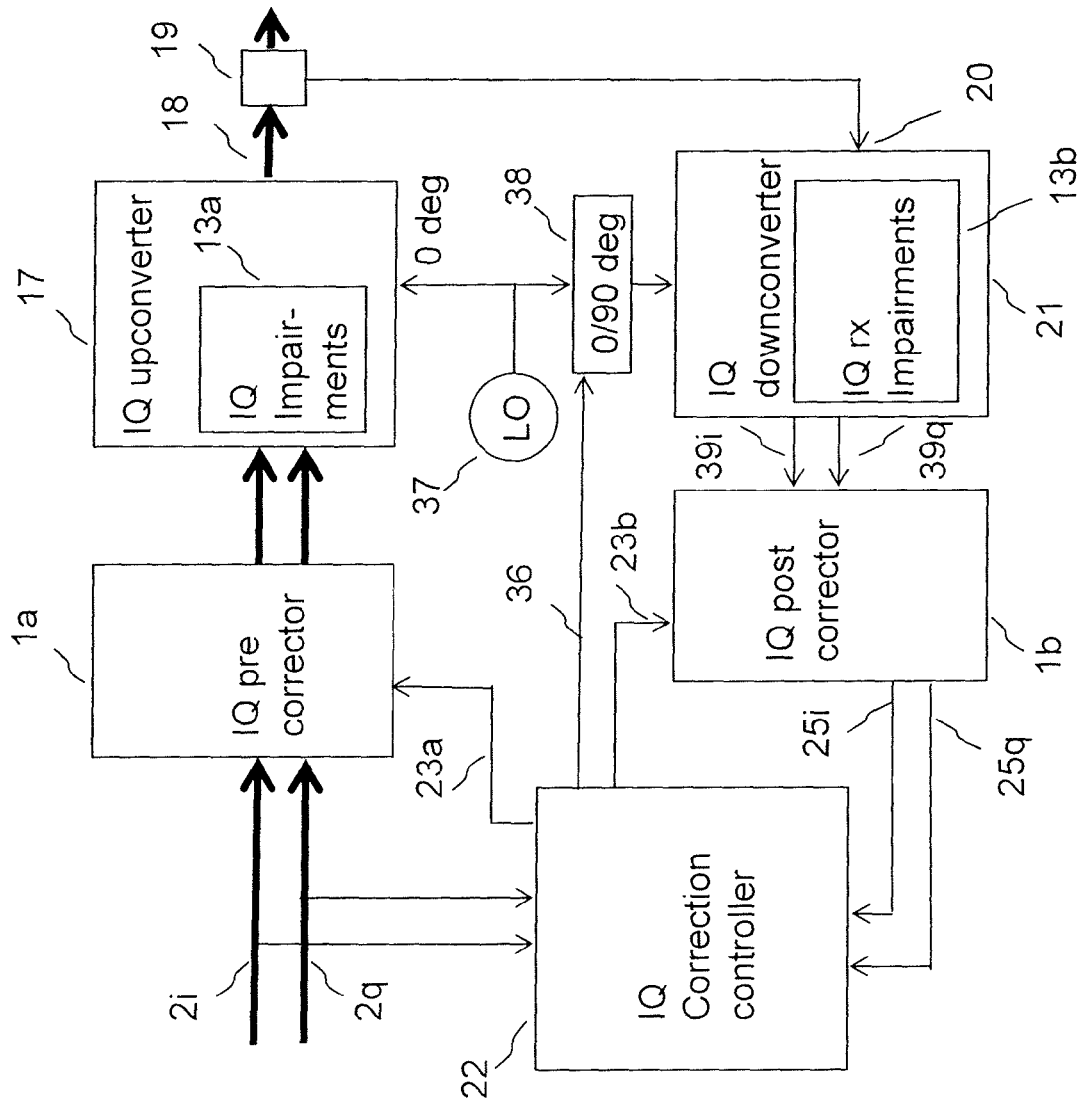
FIG. 2 is a schematic diagram showing frequency dependent pre-correction and frequency dependent post correction controlled by the comparison of a down converted signal with an input signal according to an embodiment of the invention.

FIG. 2 shows a first embodiment of the invention. A digital base band signal with in-phase components $2i$ and quadrature components $2q$ is input to a pre-corrector $1a$ and then passed to the direct conversion IQ up-converter 17. The IQ up-converter 17 comprises digital to analogue converters for the in-phase and quadrature components and the analogue signals so generated are passed via low-pass filters to a quadrature mixer for upconversion. The analogue paths inadvertently introduce quadrature errors, also called IQ impairments $13a$, in particular differential errors between in-phase and quadrature components that vary as a function of frequency within the base band, The up-converted signal 18 is output via a coupler 19, typically for input to a power amplifier for amplification in preparation for transmission from an antenna. The IQ pre-corrector $1a$ is controlled by IQ correction controller 22, specifically via control signals $23a$ in such a way as to reduce the effects of the IQ impairments $13a$.

The coupler 19 couples a sample of the output 18 of the up-converter 17 and applies the sample to the input 20 of an IQ direct conversion down-converter 21, which may be termed an observation receiver. The IQ down-converter 21 comprises a quadrature mixer that has as outputs analogue in-phase and quadrature paths that pass through analogue anti-alias filters to a pair of analogue to digital converters (not shown). The separate analogue paths inadvertently introduce quadrature errors, and similarly to the transmit path, these impairments are particularly problematic when there are differential errors between in-phase and quadrature components that vary as a function of frequency within the base band.

The digital in-phase and quadrature signal components $39i$ and $39q$ that are produced by the downconverter 21 are passed to the IQ post corrector $1b$, that is controlled by the IQ correction controller 22 via control signals $23b$ in such a way as to reduce the effects of the IQ impairments $13b$ in the receive path.

The IQ correction controller 22 compares the input signal components $2i$ and $2q$ with the signal components $25i$ and $25q$ that are output after the after IQ post corrector 1b that originate from signals received by the receive chain, that is to say by the observation receiver. The IQ correction controller 22 controls the pre-corrector 1a and post-corrector 1b via signals 23a, 23b such that the error between the input signal components 2i, 2q and the received signal components 25i, 25q is minimised. In addition the IQ controller, or possibly another controller (not shown), controls the relative phase between a local oscillator signal applied to the IQ up-converter 17 and that applied to the IQ down-converter 21. In one arrangement, suitable controlling components are shown schematically as parts 37 and 38, whose function will now be described.

Typically the relative phase between the signal produced by the local oscillator 37 and the IQ up-converter 17 and the signal produced by the local oscillator 37 and the IQ down-converter 21 is controlled between two states differing by 90 degrees. Comparison of measurements made for each state allows the IQ pre-corrector 1a to be corrected for IQ impairments in the up-converter 17 and the IQ post-corrector 1b to be corrected for IQ impairments in the down-converter 21. Typically the signal output from a local oscillator 37 is split and one part is fed to the up-converter without a phase shift and the other part is phase shifted by nominally 0 or 90 degrees alternately and fed to the down-converter. It is not necessary for the phase shift to be exactly 90 degrees, since in principle any phase difference should allow the system to resolve the correction needed for the pre-corrector from that needed by the post-corrector. It is preferable not to change the phase shift of the signal fed to the up-converter. since this phase shift would be imposed on the transmitted signal as an unwanted phase modulation. It should be noted that the variable phase shift may alternatively be imposed on the link from the coupler 19 to the input to the IQ down-converter 21. This, however. requires that the phase shifter be broader band than if the phase shifter were placed in the local oscillator path, since the signal coupled by the coupler 19 may be modulated whereas the local oscillator signal typically is not.

Figure 3:
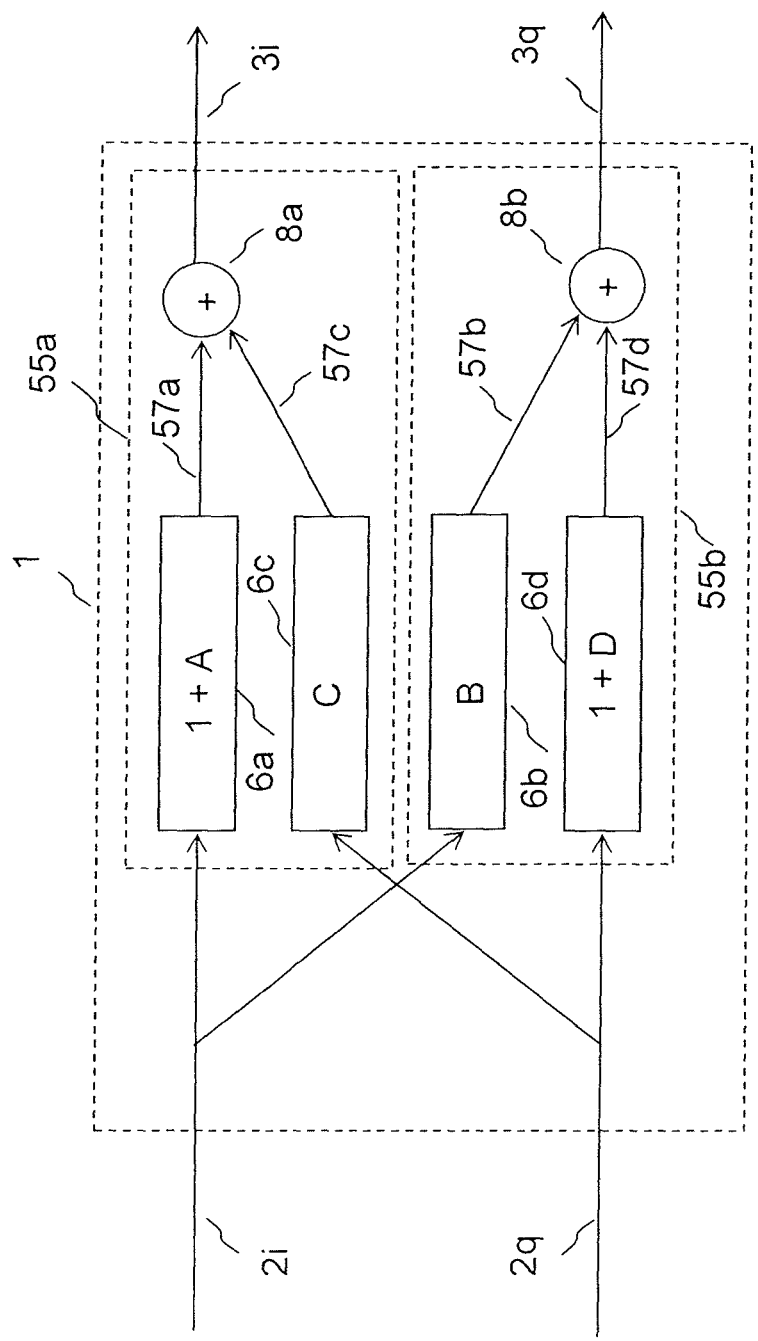
FIG. 3 is a schematic diagram showing a frequency dependent correction network according to an embodiment of the invention.

FIG. 3 shows the structure of a frequency dependent quadrature correction network according to the invention, as may be used for either a pre-correction network 1a or a post-correction network 1b. In-phase digital components enter at 2i and quadrature digital components enter at 2q. The in-phase components are split into two paths; one path passes through a digital filter 6a to a combiner 8a and thence to the in-phase output 3i. The other path passes through digital filter 6b to combiner 8b and thence to the quadrature output 3q. The transmission characteristic of digital filter 6a may be represented by 1+A to indicate that the signal passes largely unaltered except for a small factor A, that may be frequency dependent. For filter 6b, the transmission characteristic may be represented by B to indicate that the signal is attenuated by a factor B, that may be frequency dependent. Typically both A and B are much less than 1, preferably less than 0.1.

Per the in-phase components, the quadrature components are split into two paths; one path passing through a digital filter 6d to combiner 8b and thence to the quadrature output 3q. The other path passes through digital filter 6c to combiner 8a and thence to the in-phase output component 3i. The transmission characteristic of digital filter 6d may be represented by 1+D to indicate that the signal passes largely unaltered except for a mall factor D, that may be frequency dependent. For filter 6c, the transmission characteristic may be represented by C to indicate that the signal is attenuated by a factor C. that may be frequency dependent. Typically both C and D are much less than 1. and preferably less than 0.1

Figure 4:
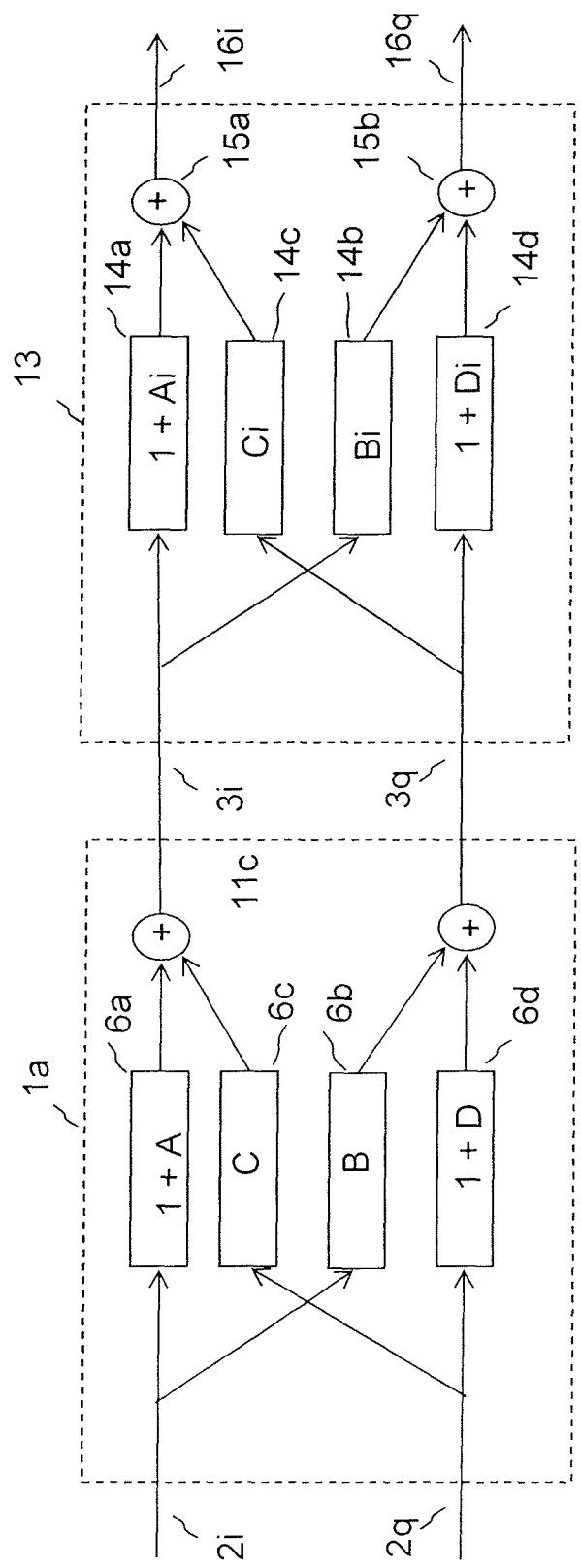
FIG. 4 is a schematic diagram showing a frequency dependent correction network according to an embodiment of the invention followed by typical network impairments as an illustration of the operation of an embodiment of the invention.

FIG. 4 illustrates how a correction network. in this case used as a pre-correction network 1a, corrects for impairments 13. It can be seen that the impairments are modelled as a network with a similar topology as the correction network 1a. In-phase components 2i pass through filter 6a and are multiplied by transmission factor 1+A, and then pass through the impairment characteristic 14a multiplied by a transmission factor 1+Ai. Here the terminology Ai is simply used to indicate that Ai is an impairment factor, not that it is an in-phase or imaginary factor. It will be apparent that square terms will be generated, but for small A, B, C and D the square terms are negligible.

Referring to FIG. 4, considering first the impairments, it can be seen that an in-phase signal component 3i entering the network simulating IQ impairments 13, is multiplied by a factor (1+Ai) and arrives at the output of the network simulating IQ impairments 13 at output port 16i. It can be seen that a component of the quadrature signal component 3q is multiplied by Ci in the network simulating IQ impairments 13 and is added in an addition block 15a to the in-phase component that was multiplied by the factor (1+Ai) to appear at the in-phase output 16i.

In order to correct for these impairments to a first approximation, a corrector network 1a is provided. An in-phase component 2i is multiplied by the factor (1+A), and a quadrature component 2q is multiplied by a factor C and added to the multiplied in-phase component and passed to the input 3i to the network simulating IQ impairments 13.

For small A and Ai, it can be shown that the impairment factor Ai may be substantially removed when A=−Ai. It can be seen by reference to FIG. 4 that square terms arise since, for example in the two cascaded in-phase signal paths through blocks 6a and 14a, the transmission factor will be $(1+A)(1−A)=1−A^2$.

Similarly, for small C and Ci, the spurious quadrature component passing through block 14c with transmission factor Ci is substantially cancelled by the component of 2q passing through block 6c of the correction network 1a with transmission factor C. when C=−Ci.

If A, B, C and D are less than 0.1 then the square terms will be less than 1% in voltage terms, that is to say −40 dB in power terms.

Similarly, the in-phase component passing through B will substantially cancel the spurious component Bi, if B=−Bi and B is small, i.e. much less than 1. It will also be apparent that if D=−Di the impairments in block 14d may also be cancelled, again when D and C are small.

It should be understood that a similar principle will apply to a post-corrector network that follows an impairment.

As has already been mentioned, the correction of differential errors in the transmission characteristic between in-phase (I) and quadrature (Q) channels is of particular importance. It is thus of practical importance that impairments that cause differential errors are cancelled, but it may be acceptable for the combination of the impairment and the correction to produce transmission characteristic that, although not the same as the transmission characteristic without the impairment, is nevertheless the same on I and Q channels. That is to say that, in the case of the illustration of FIG. 4, the desired outcome is not necessarily a situation in which the I and Q channels each have a transmission characteristic of 1. It may also be an acceptable outcome that both I and Q channels have some other transmission characteristic, provided that the characteristic on each is the same. The operation of the control loop will automatically produce optimum transmission characteristics for the filters in a correction network; it should be understood that the optimum solution will not necessarily be the application of a correction that simply returns the transmission characteristics to a state that would have existed in the absence of quadrature impairments. Indeed, the operation of the control loop may potentially improve the operation of the system beyond simply removing differential errors between in-phase and quadrature channels, if the factor that is optimised by the control loop is changed in a beneficial manner by the improvement. For example, a flattening of gain of both in-phase and quadrature channels may be achieved by the operation of the control loop.

Figure 5:
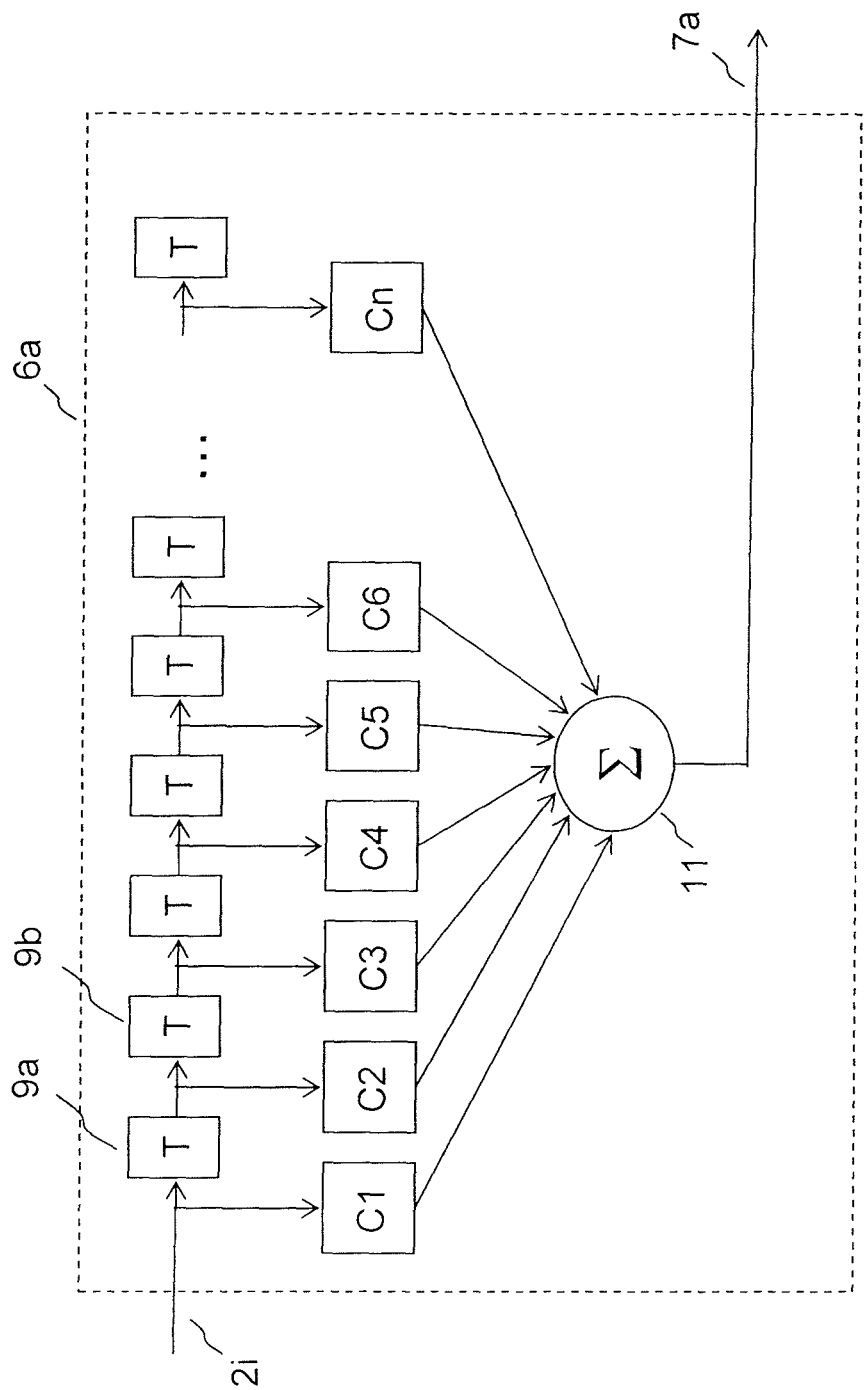
FIG. 5 is a schematic diagram showing a digital filter component of a frequency dependent correction network according to an embodiment of the invention.

FIG. 5 shows components of a typical digital filter $6a$, $6b$, $6c$ or $6d$ shown in FIG. 4. Digital signal components $2i$ are passed to a tapped delay line comprising a series of delay elements $9a$, $9b$ that each delay the signal components by a time T; this delay time T may be the sampling period of the digital signals. After each delay element, part of the signal is tapped off and multiplied by a filter coefficient or weight Cn. The weighted components are then summed in a summing component 11 and passed to the output $7a$. Filter coefficients are shown as factors C1, C2 . . . Cn. This structure constitutes a conventional finite impulse response (FIR) filter. The coefficients may be linear factors, and are controllable by the correction controller 22 in order to best cancel the impairments by matching the frequency response of the relevant component of the impairment. It is also possible that each tap may, in addition to linear factors, have controllable coefficients that operate on the squares, cubes or other non-linear functions of the tapped signal. Such a structure may be referred to as a representation of a Volterra series.

Figure 6:
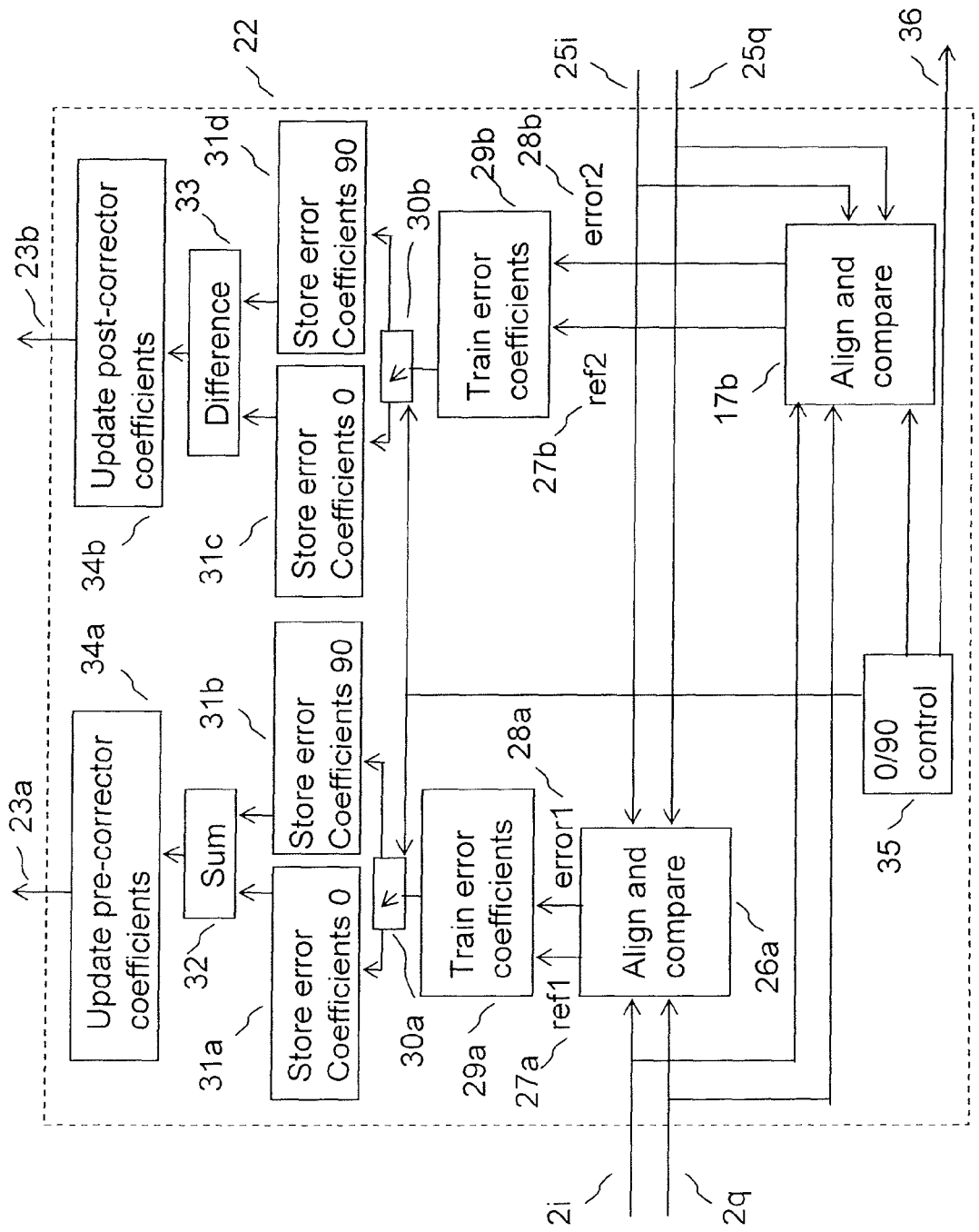
FIG. 6 is a schematic diagram showing a controller for a frequency dependent pre-correction network and a frequency dependent post-correction network according to an embodiment of the invention.

FIG. 6 shows the IQ correction controller 22 in more detail. Input in-phase $2i$ and quadrature $2q$ components that are input to the controller and are compared with the in-phase $25i$ and quadrature $25q$ components from the observation receiver as has been already mentioned. In order to correct for phase shifts and amplitude imbalances occurring due to the practical implementation of a system, it is necessary to align the signal components from the input relative to those from the observation receiver before carrying out a comparison to generate an error signal. The reason for this is that the error signal should represent the effect of the contribution of the IQ impairments, rather than effects due to other circuit elements. For control of the pre-corrector coefficients, an align and compare block $26a$ operates to align the received signals $25i$, $25q$ in phase with the input signal components $2i$, $2q$. For control of the post-corrector coefficients, the align and compare block $17b$ operates to align the input signal $2i$, $2q$ in phase with the received signal components $25i$, $25q$.

Considering first the operation of the controller 22 to update the pre-corrector error coefficients, the align and compare block $26a$ generates a reference output ref1 $27a$, that represents the input signal component, and an error output error1 $28a$ that represents the difference between the aligned signal from the observation receiver with the input signal component. The signals ref1 and error1 are passed to the train error coefficients functional block $29a$. This block maintains a model of the corrector network in terms of topology and the training involves adjusting the error coefficients such that, when applied to the reference, the model of the corrector network produces the error signal. This may be done by conventional techniques. A suitable technique involves solution of a set of simultaneous equations relating the input to the error signal to produce a set of coefficients. Typically this will be repeated many times and a least mean squares method will be applied to produce an optimum result from the multiple measurements. A similar process is used to train the error coefficients for the post corrector using the train error coefficients functional block $29b$.

As has been already mentioned, the training process described cannot distinguish between the coefficients required for the pre-corrector and those required for the post-corrector; to accommodate this ambiguity the training can be performed in two stages: initially with the local oscillator signals for the up-converter and the down-converter in a first relative phase state, and subsequently with the local oscillator signals in a second relative phase state, typically 90 degrees different from the first relative phase state.

Considering first the control of the pre-corrector coefficients, the switch $30a$ operating on the output of the train error coefficients functional block $29a$ directs the error coefficients to be stored for local oscillator phase state 0 at store $31a$ and directs those error coefficients calculated at local oscillator phase state 90 (that is, 90 degrees different than phase state 0) to be stored separately at store $31b$. The sum of the two stores of error coefficients, indicated schematically by part 32, is then used as an update to be added to the pre-corrector coefficients. The pre-corrector coefficients are iteratively updated by adding the sum of the stored error coefficients 32 trained in the two local oscillator states, in order to substantially cancel the IQ impairments.

The post corrector coefficients are updated by a similar process via parts $31c$. $31d$ and 33. but taking the difference between the stored error coefficients for the two local oscillator states rather than the sum thereof. If a phase shift is introduced into the alignment process at one local oscillator phase relationship and not another, then a corresponding phase shift should be applied to the stored error coefficients before the sum or difference operations, in order to compensate for the phase shift. The combined process of phase shift and sum operation, and similarly the combined process of phase shift and difference operation, may be termed vectorial combinations.

Figure 7:
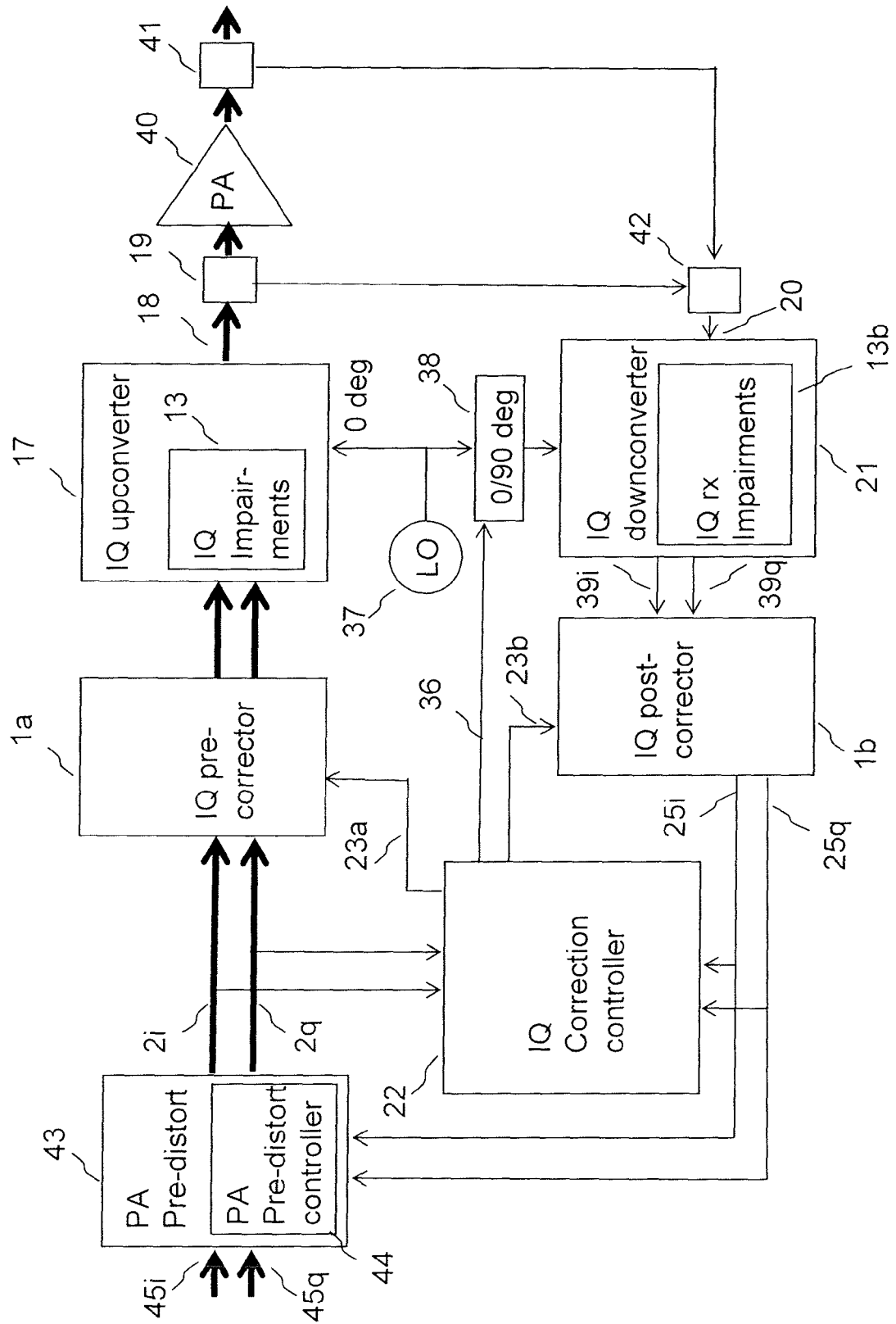
FIG. 7 is a schematic diagram showing frequency dependent pre-correction and frequency dependent post correction according to an embodiment of the invention.

FIG. 7 illustrates the system of FIG. 6 applied to a transmit chain employing pre-distortion to correct for non-linearities in a power amplifier 40.

It is particularly advantageous to use embodiments of this invention in combination with a system for linearising the response of a power amplifier by pre-distortion. Wireless communication devices, such as base stations and terminals, have a transmit chain which includes a power amplifier to amplify a modulated signal to a high power level for transmission over a wireless channel. It is known that elements in the transmit chain can introduce distortion to the transmitted signal and therefore there have been various proposals to compensate for distortion. One such proposal is a pre-distortion architecture where a low power modulated signal is pre-distorted in a manner which will compensate for non-linear effects of a power amplifier, before being applied to the input of the power amplifier. The combination of the pre-distortion applied to the input signal, and the (inevitable) non-linear distortion applied to the input signal by the power amplifier, result in a substantially distortion-free output signal.

Typically, an adaptive pre-distortion architecture applies pre-distortion in the digital domain before up-conversion. Pre-distorted signals for in-phase and quadrature channels are digitally created at base band, are separately converted to analogue, and are then directly up-converted by applying them to the in-phase and quadrature branches of a direct conversion up-converter, also known as an IQ up-converter. A portion of the up-converted output signal is fed back to a comparison function to control the pre-distortion system. This feedback path is known as an observation receiver, and can either down-convert a sampled portion of the up-converted output signal to an Intermediate Frequency (IF), or can down-convert a sampled portion of the up-converted output signal directly to base band.

As has been mentioned, the direct conversion approach may be advantageous in terms of economical implementation, but may suffer from the effects of differential errors in the in-phase and quadrature signal paths. The direct conversion approach has the particular advantage that the local oscillator for the downconversion and the upconversion operate at the same frequency and so use may use the same synthesiser, avoiding the risk of spurious frequency frequency generation involved if a direct conversion architecture were used for the up-converter with an intermediate frequency architecture used for the down-converter.

Figure 1:
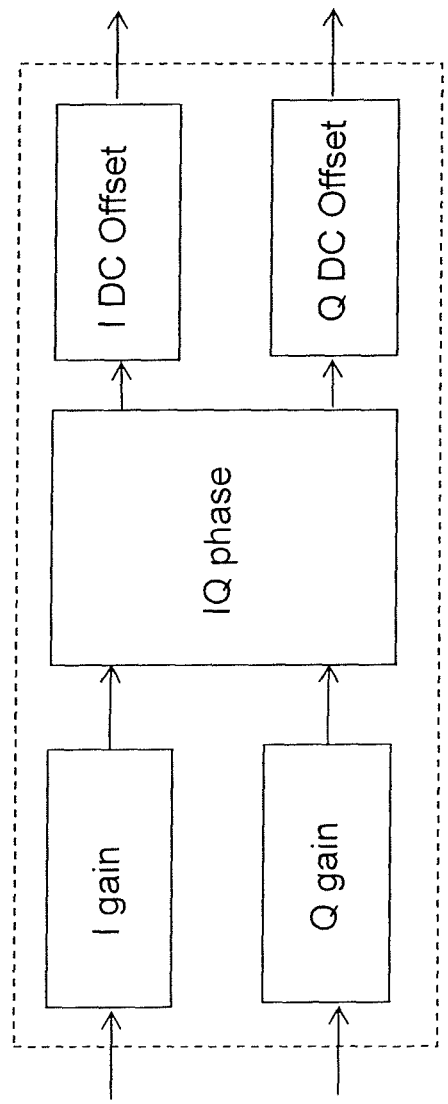
FIG. 1 is a schematic diagram showing a conventional quadrature correction network.

However, the inherent quadrature errors have inhibited the use, and effectiveness, of a direct conversion architecture in the observation receiver path. Methods to correct for non-frequency dependent up-converter imperfections are known, and involve use of a conventional quadrature error corrector as shown in FIG. 1; however these do not include additional quadrature impairments that are required to correct for these imperfections. If the observation receiver uses a direct conversion architecture then quadrature errors will be introduced in the observation receiver. Even once the quadrature errors in the up-converter have been compensated for, the errors in the down-converter impair the observation signal used to control the power amplifier predistortion and limit the effectiveness of the amplifier predistortion correction loop. Accordingly, it is necessary to correct for errors introduced by the up-converter and down-converter. The system illustrated in FIG. 8 is designed to achieve this.

It can be seen that a power amplifier predistortion controller 44 receives input signal components 45i, 45q and also the corrected signal components 25i, 25q from an observation receiver, corrected by an IQ post-corrector 1b. The power amplifier predistortion controller 44 uses these input components to generate a predistortion characteristic to apply to the input signal in the PA pre-distort block 43, to produce the input components 2i, 2q to the IQ pre-corrector stage 1a. The pre-corrected signal component is then applied to the IQ up-converter 17 and the up-converted signal component passes though coupler 19 to power amplifier 40 and then passes through a second coupler 41 for transmission. Switch 42 directs the signal components to the IQ down-converter 21 from the coupler 19 that is located upstream of the power amplifier (PA) 40 when the IQ correction controller is operating, and directs signal components from coupler 41 to the down-converter 21 when the PA predistort controller 44 is operating. This is because the PA controller 44 operates to minimise the difference between the input to the transmit chain 45i, 45q (the input to the PA predistort block 43) and the output of the power amplifier (as measured at the output 25i, 25q of the IQ post corrector 1b by appropriate setting of the switch 42), whereas the IQ controller correction controller 22 operates to minimise the difference between the input 2i, 2q to the IQ pre-corrector 1a and the output of the IQ up-converter 17 (also as measured at the output 25i, 25q of the IQ post corrector 1b with appropriate setting of switch 42).

Figure 8:
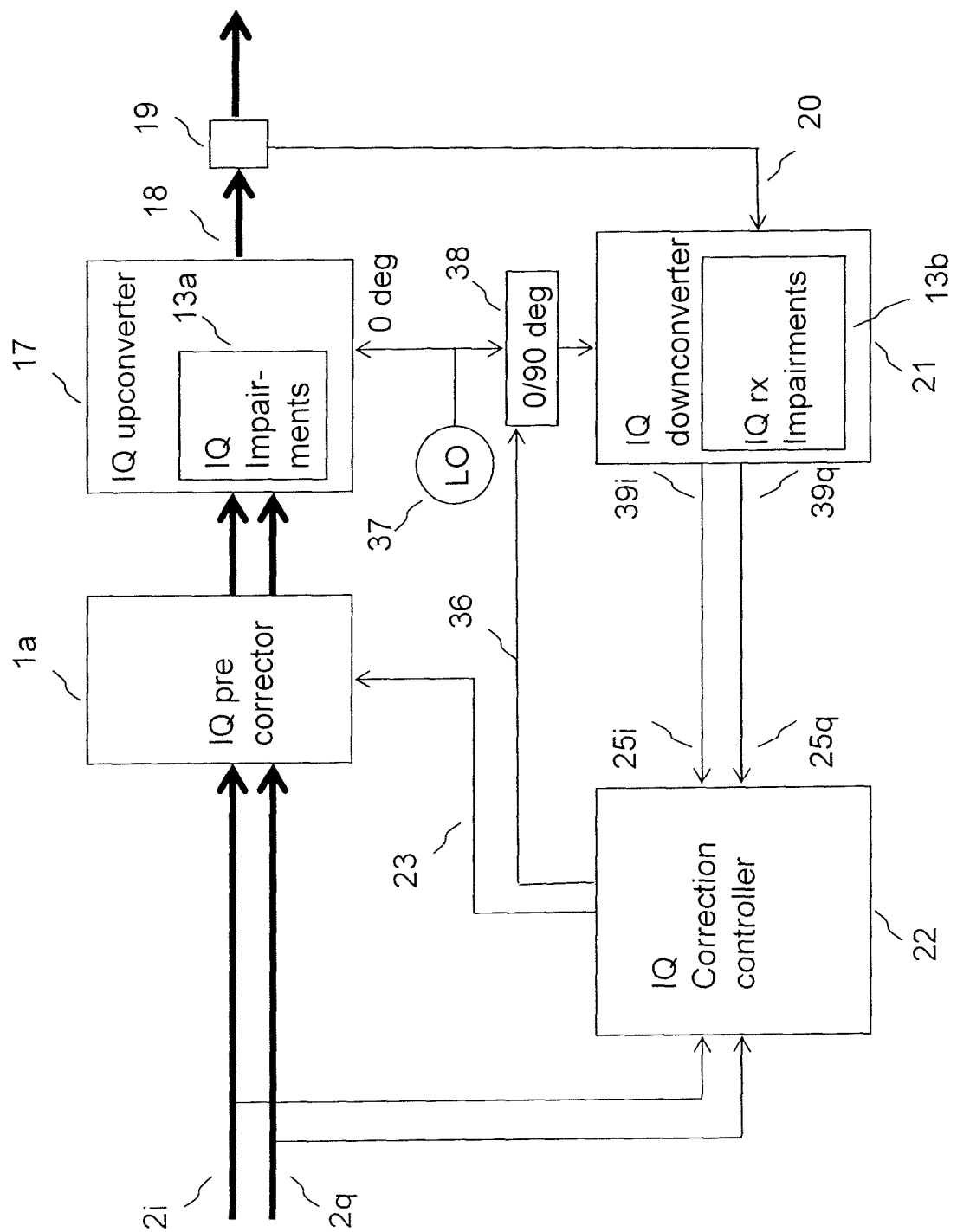
FIG. 8 is a schematic diagram showing frequency dependent pre-correction according to an embodiment of the invention.
Figure 9:
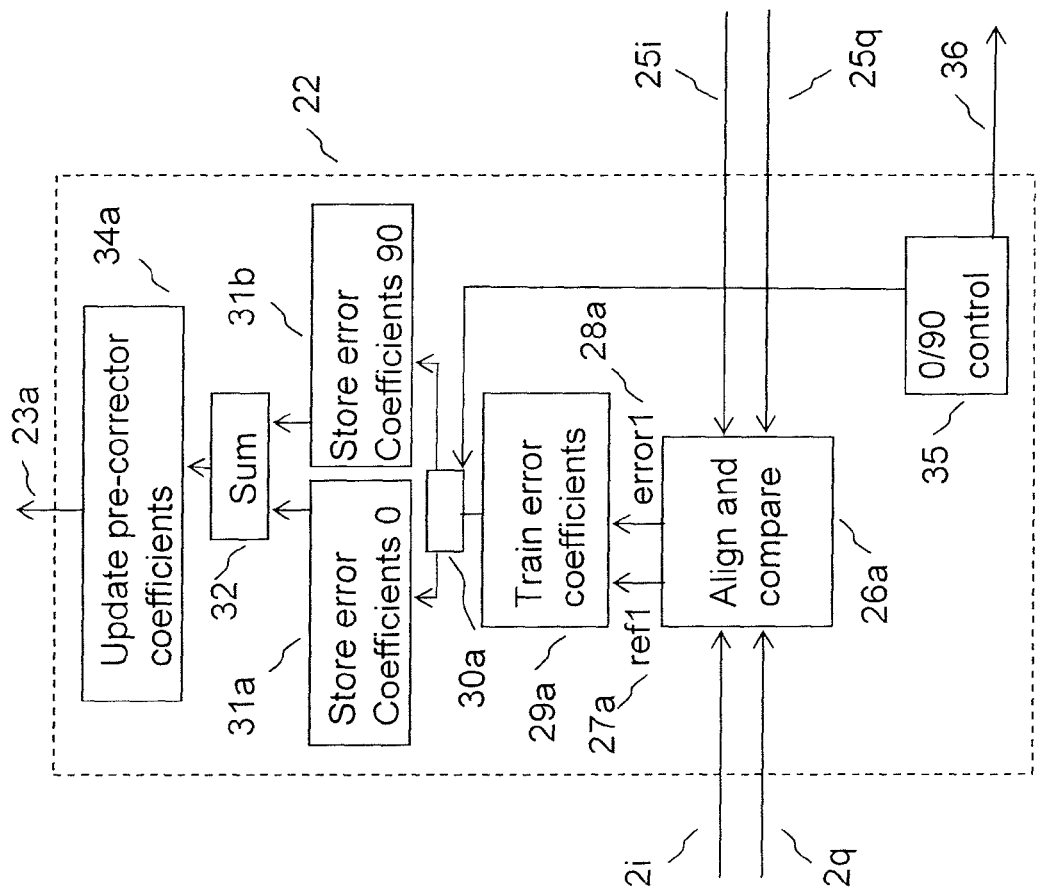
FIG. 9 is a schematic diagram showing detail of a controller for a frequency dependent pre-correction network according to an embodiment of the invention.

FIG. 8 illustrates that the system of FIG. 2 may operate without applying post-correction, that is without calculating or applying coefficients to a post-corrector 1b. FIG. 9 shows an IQ correction controller 22 controlling the IQ pre-corrector 1a only. It has been found that the pre-correction coefficients of IQ pre-corrector 1a can be trained to cancel the IQ impairments 13a in the up-converter even if the post-corrector is absent. Generally it is beneficial, but not essential, to implement the post-corrector 1b in order to speed up the convergence of the IQ correction control loop. It is also beneficial to correct the output of the IQ down-converter when used with a power amplifier predistortion control loop, in order to optimise the performance of the loop.

Figure 10:
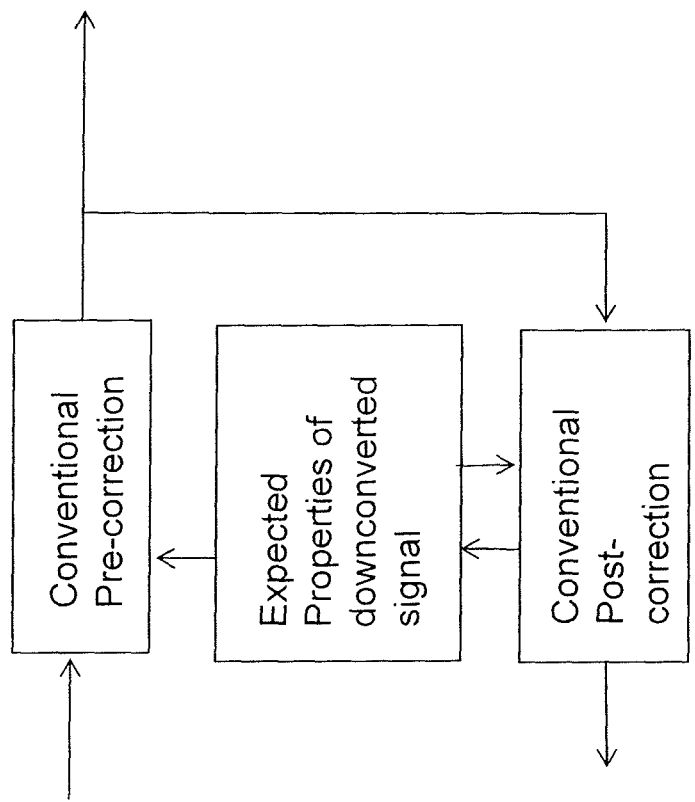
FIG. 10 is a schematic diagram showing conventional pre-correction and post-correction networks controlled by the optimisation of expected properties of a down converted signal.

FIG. 10 illustrates in block diagram form a system in which conventional pre-correction and post-correction networks controlled by the optimisation of expected properties of a down converted signal, as disclosed in co-pending U.S. patent application Ser. No. 11/962432. This application addresses the correction of non-frequency dependent quadrature errors in a system with a direct conversion up-converter and an observation receiver using a direct conversion down-converter architecture. A technique is disclosed that may distinguish between quadrature errors in the up-converter and those in the down-converter, by the use of measurements made with the up-converter and down-converter local oscillators in a first phase relationship, and then further measurements with the up-converter and down-converter local oscillators in a second phase relationship, typically 90 degrees different from the first phase relationship. The measurements are of properties of signals received in the observation receiver and that are compared with expected properties of the signal. For example, the long term correlation between in-phase and quadrature components may be expected to be zero for an ideal signal, as may be the DC voltage component. Quadrature errors in the up-converter and down-converter paths are then separately corrected using correction networks that apply a correction that is nominally the same irrespective of frequency within the base band. Such corrections typically comprise correction of voltage offsets, that is to say DC offsets, differential gain characteristics between in-phase and quadrature signal paths, and phase error between in-phase and quadrature signal paths. A conventional quadrature correction network may be used, such as that illustrated in FIG. 1.

However, there may be errors, and in particular differential errors, in both the up-conversion and down-conversion that are that dependent on frequency within the base band. For example, analogue filtering may introduce such errors, particularly in anti-aliasing filters, due to the variation of the values of analogue components within component tolerance limits and with temperature. Conventional correction networks such as that illustrated in FIG. 1 cannot correct such errors.

Also, measurements based on long-term averages of expected properties of received signals are inherently slow and may not provide sufficient loop gain and stability to correct quadrature errors to a high degree of accuracy.

Figure 11:
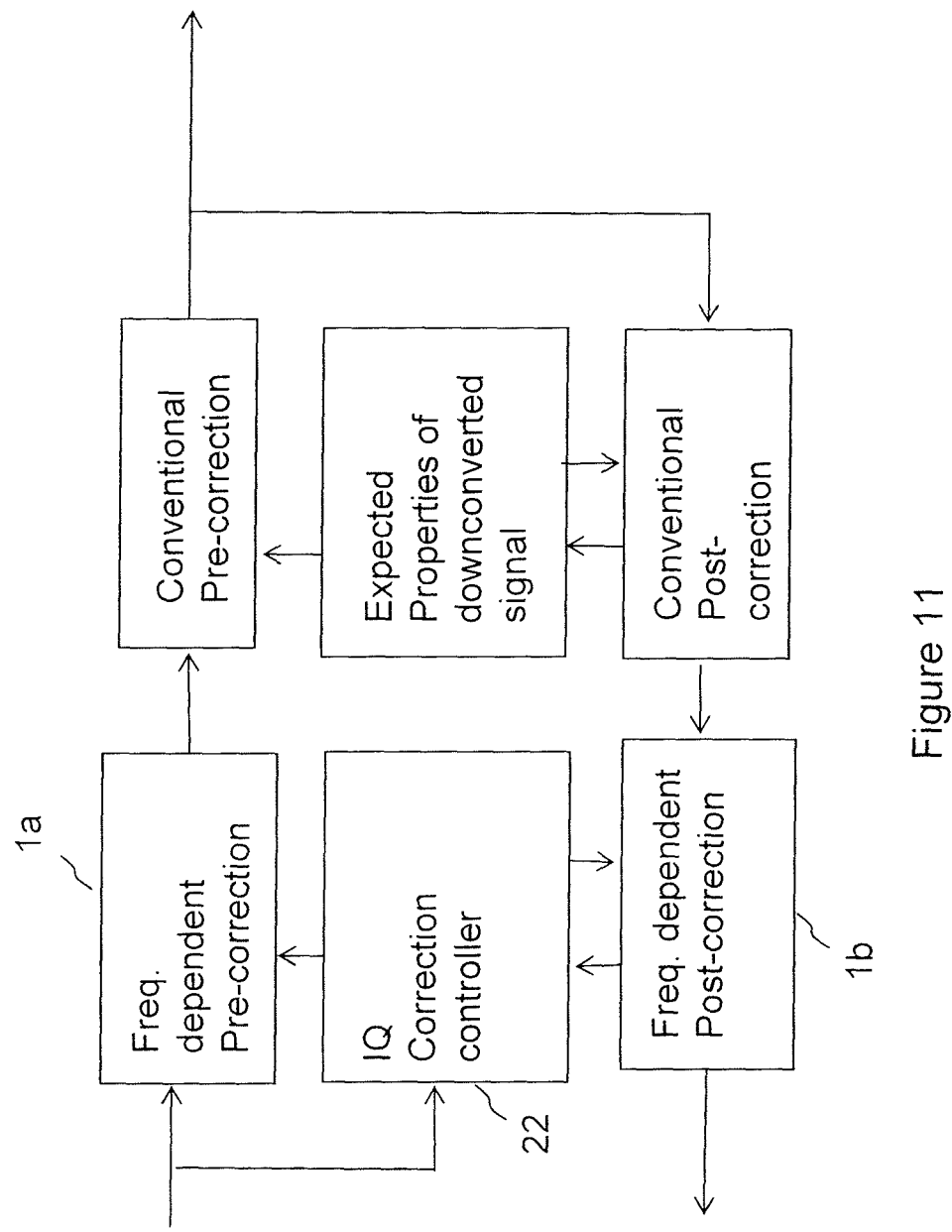
FIG. 11 is a schematic diagram showing frequency dependent pre-correction and frequency dependent post correction as according to a yet further embodiment of the invention.

Advantageously the conventional system of FIG. 10 may be used in conjunction with embodiments of the present invention already described, in particular as illustrated in FIGS. 6 and 7, to address the correction of frequency dependent quadrature errors, as illustrated in FIG. 11. FIG. 11 shows that frequency dependent and conventional pre-correction networks may be cascaded, as may frequency dependent and conventional post-correction networks. It may be beneficial to remove gross errors using a conventional quadrature correction circuit such as that of FIG. 1 in order to improve the operation of the frequency dependent pre-corrector control loop. The conventional pre-correction circuit may be controlled to optimise expected properties of the down converted signal as already described by reference to FIG. 10. In particular, it is beneficial to correct DC offsets in this manner, since a conventional quadrature correction circuit is well suited to this function and a control loop based on the expected properties of an observed signal is particularly effective for the control of a conventional IQ correction circuit.

It will be apparent that embodiments of the invention may be applicable to wired systems such as cable TV in addition to wireless systems.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A correction network comprising:
an in-phase input port configured to receive an in-phase portion of a signal;
a quadrature input port configured to receive a quadrature portion of the signal;
an in-phase output port configured to provide an in-phase portion of a corrected version of the signal;
a quadrature output port configured to provide a quadrature portion of the corrected version of the signal;
digital filters comprising:
a first digital filter connecting the in-phase input port to the in-phase output port;
a second digital filter connecting the in-phase input port to the quadrature output port, and configured to attenuate the in-phase portion of the signal by a frequency dependent first factor;
a third digital filter connecting the quadrature input port to the in-phase output port, and configured to attenuate the quadrature portion of the signal by a frequency dependent second factor; and
a fourth digital filter connecting the quadrature input port to the quadrature output port; and
at least one correction controller configured to adjust filter tap coefficients of the first, second, third and fourth digital filters according to at least an alignment of the signal with a down-converted signal generated based on the corrected version of the signal to reduce at least one difference between a transmission characteristic of an in-phase signal path configured to transmit the in-phase portion of the signal, and a quadrature signal path configured to transmit the quadrature portion of the signal.

2. The correction network of claim 1, wherein at least one of the digital filters is a finite impulse response filter.

3. The correction network of claim 1, wherein at least one of the digital filters is an infinite impulse response filter.

4. The correction network of claim 1, wherein at least one of the digital filters is a polynomial structure based on a Volterra series.

5. A method of reducing a difference between a transmission characteristic of an in-phase signal path and a transmission characteristic of a quadrature signal path, the in-phase signal path being for transmission of an in-phase portion of a signal, and the quadrature signal path being for transmission of a quadrature portion of the signal, the method comprising:
coupling a digital filter network in the in-phase signal path and in the quadrature signal path; and
operating the digital filter network to reduce at least one difference between a transmission characteristic of the in-phase signal path and the quadrature signal path, said operating the digital filter network comprising:
generating a corrected version of the signal based on the in-phase portion of the signal and the quadrature portion of the signal;
configuring filter tap coefficients of the digital filter network according to at least an alignment of the signal with a down-converted signal generated based on the corrected version of the signal;
attenuating the in-phase portion of the signal by a frequency dependent first factor; and
attenuating the quadrature portion of the signal by a frequency dependent second factor.

6. The method of claim 5, comprising filtering at least one of the in-phase portion of the signal and the quadrature portion of the signal with at least one finite impulse response filter.

7. The method of claim 5, comprising filtering at least one of the in-phase portion of the signal and the quadrature portion of the signal with at least one infinite impulse response filter.

8. The method of claim 5, comprising filtering at least one of the in-phase portion of the signal and the quadrature portion of the signal with at least one digital filter having a polynomial structure based on a Volterra series.

9. A method of generating a signal, the method comprising:
receiving, by a correction network, an input signal, and providing, by the correction network, a pre-corrected signal based on the input signal;
generating, by a quadrature up-converter, an up-converted signal based on the pre-corrected signal;
generating, by a down-converter,. a down-converted signal based on the up-converted signal;
comparing the down-converted signal with the input signal; and
modifying values of filter tap coefficients of the correction network according to the comparison to reduce a difference between a transmission characteristic of an in-phase signal path and a quadrature signal path comprised in the transmit chain.

10. The method of claim 9, wherein said modifying the values of the filter tap coefficients applies a frequency-dependent correction to frequency components of the input signal inside the correction network.

11. The method of claim 9, comprising:
determining an error according to the comparing;
wherein said modifying the values of the filter tap coefficients comprises using the error signal and the input signal to modify the values of the filter tap coefficients.

12. The method of claim 9, further comprising:
providing the up-converter and the down-converter with a local oscillator signal generated by a local oscillator signal source, the local oscillator having a plurality of operational states comprising:
a first operational state in which the local oscillator is configured to input the local oscillator signal to the up-converter and to the down-converter; and
a second operational state in which the local oscillator is configured to:
apply a phase shift to the local oscillator signal;
input the local oscillator signal to one of the up-converter or the down-converter; and
input the phase shifted local oscillator signal to the other of the up-converter or the down-converter;
determining, for each operational state, an error signal, comprising comparing the down-converted signal with the input signal;
determining, for each operational state, intermediate values of the filter tap coefficients according to the error signal and the input signal; and
updating current values of the filter tap coefficients to produce updated values of the filter tap coefficients according to a vector combination of the intermediate values of the filter tap coefficients and current values of the filter tap coefficients.

13. The method of claim 12, wherein:
the down-converter is in operative association with a post-correction network that comprises post-corrector filter tap coefficients and is configured to correct a differential error between an in-phase transmission path and a quadrature transmission path in the quadrature down-converter, the down-converted signal comprising frequency components within a base band; and
the method further comprises:
updating current values of the post-corrector filter tap coefficients to produce updated values of the post-corrector filter tap coefficients according to a vector combination of the intermediate values of the filter tap coefficients and the current values of the post-corrector set of filter tap coefficients; and
using the updated post-corrector set of values to control the post-correction network, comprising correcting the differential error in the quadrature down-converter, comprising applying a correction to each frequency component that is dependent on a frequency of the frequency component within the base band.

14. A signal chain, comprising:
a correction network configured to:
receive an input signal;
operate on the input signal according to filter tap coefficients; and
provide a corrected signal resulting from the correction network operating on the input signal;
a quadrature up-converter configured to up-convert the corrected signal and provide an up-converted signal resulting from the quadrature up-converter up-converting the corrected signal; and
a quadrature down-converter configured to down-convert the up-converted signal coupled from the quadrature up-converter to the quadrature down-converter, and provide a down-converted signal resulting from the quadrature down-converter down-converting the up-converted signal; and
a correction controller configured to:
compare the down-converted signal with the input signal; and
modify values of the filter tap coefficients according to the comparison to reduce a difference between a transmission characteristic of an in-phase signal path and a quadrature signal path of the input signal.

15. The signal chain of claim 14, wherein the correction controller is configured to modify the values of the filter tap coefficients such that a frequency-dependent correction is applied to frequency components of signals transmitted in the quadrature signal path and the in-phase signal path.

16. The signal chain of claim 14, wherein the correction controller is configured to:
determine an error signal according to the comparison; and
use the error signal and the input signal to modify the values of the filter tap coefficients.

17. The signal chain of claim 14, further comprising:
a local oscillator signal source configured to provide the up-converter and the downconverter with a local oscillator signal, the local oscillator having a plurality of operational states comprising:
a first operational state in which the local oscillator is configured to input the local oscillator signal to the up-converter and to the down-converter; and
a second operational state in which the local oscillator is configured to;
input the local oscillator signal to one of the up-converter or the down-converter;
apply a phase shift to local oscillator signal; and
input the phase shifted local oscillator signal to the other of the up-converter or the down-converter;
wherein the correction controller is configured to:
determine, for each operational state, an error signal by comparing the down-converted signal with the input signal;
determine, for each operational state, intermediate values of the filter tap coefficients according to the error signal and the input signal; and
update current values of the filter tap coefficients to produce updated values of the filter tap coefficients according to a vector combination of the intermediate values of the filter tap coefficients and the current values of the filter tap coefficients.

18. The signal chain of claim 17, further comprising:
a post-correction network configured to operate according to post-corrector filter tap coefficients, and correct a differential error between an in-phase transmission path and a quadrature transmission path in the quadrature down-converter, the down-converted signal comprising frequency components within a base band;
wherein the correction controller is configured to:
update current values of the post-corrector filter tap coefficients to produce updated values of the post-corrector filter tap coefficients according to a vector combination of the intermediate values of the filter tap coefficients and the current values of the post-corrector coefficients; and
use the updated values of the post-corrector_filter tap coefficients to control the post-correction network such that the differential error in the quadrature down-converter is corrected by a correction applied to each respective frequency component that is dependent on the frequency of the frequency component within the base band.

19. A base station, comprising a signal chain as claimed in claim 14.

20. A mobile terminal, comprising a signal chain as claimed in claim 14.

* * * * *